US008860798B2

(12) United States Patent
Kino

(10) Patent No.: US 8,860,798 B2
(45) Date of Patent: Oct. 14, 2014

(54) IMAGE-CAPTURING DEVICE AND IMAGE PROCESSING METHOD

(75) Inventor: Tatsuya Kino, Koganei (JP)

(73) Assignee: Olympus Imaging Corp. (JP)

( * ) Notice: Subject to any disclaimer, the term of this patent is extended or adjusted under 35 U.S.C. 154(b) by 491 days.

(21) Appl. No.: 13/211,435

(22) Filed: Aug. 17, 2011

(65) Prior Publication Data

US 2012/0075458 A1   Mar. 29, 2012

(30) Foreign Application Priority Data

Sep. 29, 2010   (JP) ................. 2010-218759

(51) Int. Cl.
*H04N 7/18*   (2006.01)
*H04N 9/24*   (2006.01)
*H04N 9/47*   (2006.01)
*H04N 9/73*   (2006.01)

(52) U.S. Cl.
CPC ............... *H04N 7/183* (2013.01); *H04N 9/735* (2013.01)
USPC .......................... 348/81; 348/223.1; 348/813

(58) Field of Classification Search
CPC ................... H04N 9/73; H04N 7/18
See application file for complete search history.

(56) References Cited

U.S. PATENT DOCUMENTS

| 7,522,191 | B2 | 4/2009 | Hara et al. |
| 2005/0163391 | A1* | 7/2005 | Ishida ......................... 382/254 |
| 2006/0114335 | A1* | 6/2006 | Hara et al. ................. 348/223.1 |
| 2011/0187890 | A1 | 8/2011 | Takayama et al. |

FOREIGN PATENT DOCUMENTS

| CN | 1780406 A | 5/2006 |
| JP | 06-351025 | 12/1994 |
| JP | 2004-194303 A | 7/2004 |
| JP | 2004-282460 A | 10/2004 |
| JP | 2006-157316 | 6/2006 |
| JP | 2006-197082 | 7/2006 |
| JP | 2006-201635 | 8/2006 |
| JP | 2008-017198 | 1/2008 |
| JP | 2008-227951 | 9/2008 |
| JP | 2012-124877 A | 6/2012 |

OTHER PUBLICATIONS

Office Action issued in corresponding Chinese Patent Application No. 201110301355.0 on Feb. 17, 2014, consisting of 7 pp.
Office Action issued in corresponding Japanese Patent Application No. 2010-218759 on Jul. 1, 2014, consisting of 3 pp.

* cited by examiner

*Primary Examiner* — Joseph Ustaris
*Assistant Examiner* — Maryam Nasri
(74) *Attorney, Agent, or Firm* — Volpe and Koenig, P.C.

(57) ABSTRACT

An image-capturing device includes an image-capturing unit that generates image data, a color information acquisition unit that obtains color information from the image data, a determination unit that determines whether the image data have been generated by underwater photography or onshore photography, an underwater color balance reference setting unit that sets an underwater color balance reference that serves as a color correction reference when color correction is performed on image data picked up underwater, an underwater color correction data calculation unit that calculates underwater color correction data on the basis of the color information and the underwater color balance reference in a case where the determination unit determines that the image data have been generated by underwater photography, and a color correction unit that performs color correction on the image data generated by underwater photography on the basis of the underwater color correction data.

9 Claims, 16 Drawing Sheets

| R_ave | R_ave | ... | R_ave | R_ave |
|-------|-------|-----|-------|-------|
| R_ave | R_ave | ... | R_ave | R_ave |
| :     | :     | ... | :     | :     |
| R_ave | R_ave | ... | R_ave | R_ave |
| R_ave | R_ave | ... | R_ave | R_ave |

FIG. 4B

| G_ave | G_ave | ... | G_ave | G_ave |
|-------|-------|-----|-------|-------|
| G_ave | G_ave | ... | G_ave | G_ave |
| :     | :     | ... | :     | :     |
| G_ave | G_ave | ... | G_ave | G_ave |
| G_ave | G_ave | ... | G_ave | G_ave |

FIG. 4C

| B_ave | B_ave | ... | B_ave | B_ave |
|-------|-------|-----|-------|-------|
| B_ave | B_ave | ... | B_ave | B_ave |
| :     | :     | ... | :     | :     |
| B_ave | B_ave | ... | B_ave | B_ave |
| B_ave | B_ave | ... | B_ave | B_ave |

*FIG. 7A*
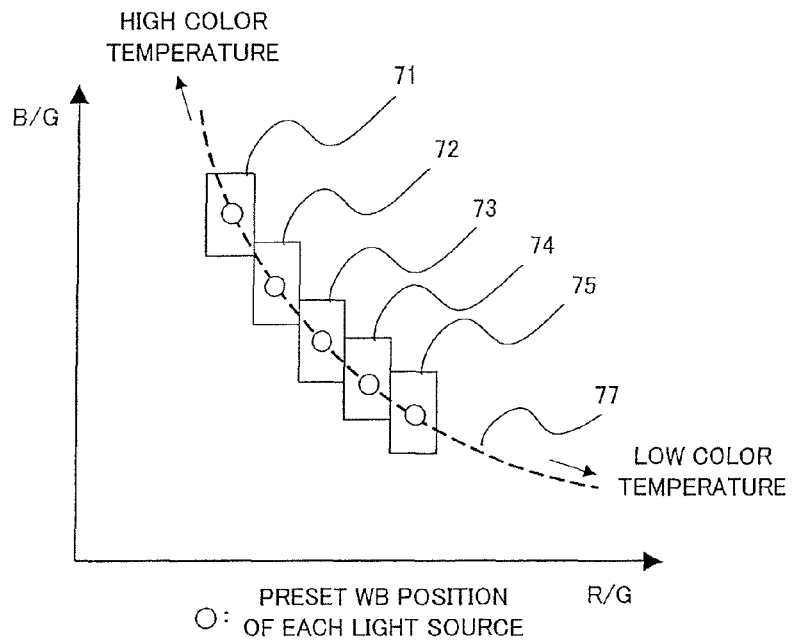
*FIG. 7B*
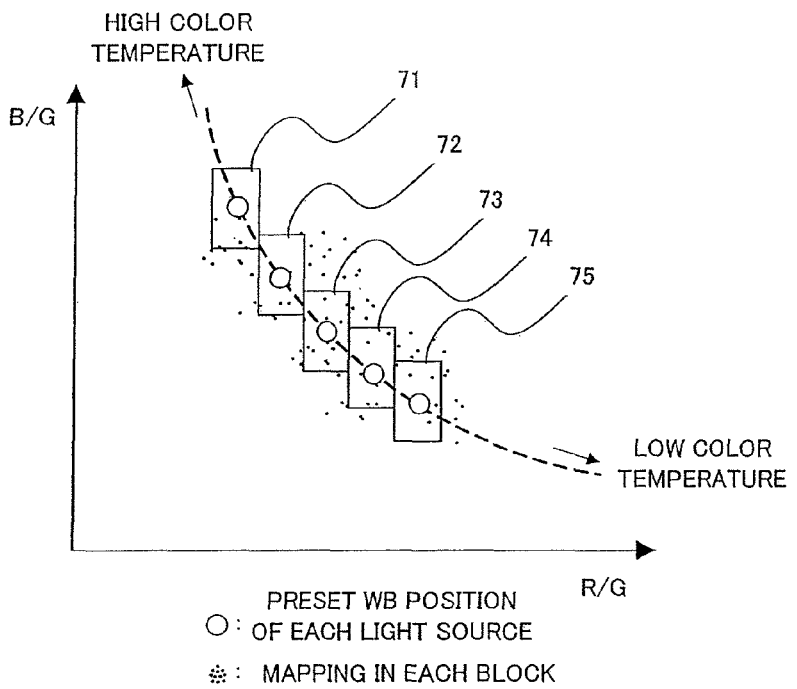
*FIG. 7C*
| | AREA 71 | AREA 72 | AREA 73 | AREA 74 | AREA 75 |
|---|---|---|---|---|---|
| COUNT NUMBERS | 5 | 11 | 39 | 33 | 24 |

IMAGE-CAPTURING DEVICE AND IMAGE PROCESSING METHOD

FIELD OF THE INVENTION

This invention relates to a technique for color-correcting image data obtained by underwater photography.

BACKGROUND OF THE INVENTION

In a known conventional technique for performing white balance correction, an underwater light source color locus is prepared separately from a normal light source color locus, and on the basis of color information obtained from an image photographed underwater and the underwater light source color locus, a light source color corresponding to a photographic condition of the image is calculated (see JP2008-17198A).

SUMMARY OF THE INVENTION

An image-capturing device of an aspect of the present invention includes an image-capturing unit that generates image data by subjecting object light received by an image sensor to photoelectric conversion, a color information acquisition unit that obtains color information from the image data, a determination unit that determines whether the image data have been generated by underwater photography or onshore photography, an underwater color balance reference setting unit that sets an underwater color balance reference that serves as a color correction reference when color correction is performed on image data picked up underwater, an underwater color correction data calculation unit that calculates underwater color correction data on the basis of the color information obtained by the color information acquisition unit and the underwater color balance reference in a case where the determination unit determines that the image data have been generated by underwater photography, and a color correction unit that performs color correction on the image data generated by underwater photography on the basis of the underwater color correction data calculated by the underwater color correction data calculation unit.

An image processing method of another aspect of the present invention includes a step of inputting image data, a step of obtaining color information from the image data, a step of determining whether the image data have been generated by underwater photography or onshore photography, a step of setting an underwater color balance reference that serves as a color correction reference when color correction is performed on image data picked up underwater, a step of calculating underwater color correction data on the basis of the color information and the underwater color balance reference in a case where it is determined that the image data have been generated by underwater photography, and a step of performing color correction on the image data generated by underwater photography on the basis of the underwater color correction data.

BRIEF DESCRIPTION OF THE DRAWINGS

These and other features, aspects, and advantages of the apparatus and methods of the present invention will become better understood with regard to the following description, appended claims, and accompanying drawings.

FIG. 3A is a view showing image data read from an SDRAM.

FIG. 4A is a view showing results obtained when average values of R pixel values are calculated for each evaluation block region of the image data.

FIG. 4B is a view showing results obtained when average values of G pixel values are calculated for each evaluation block region of the image data.

FIG. 4C is a view showing results obtained when average values of B pixel values are calculated for each evaluation block region of the image data.

FIG. 7A is a view showing white balance determination areas set on color space coordinates having R/G on the abscissa and B/G on the ordinate.

FIG. 7B is a view showing the WB evaluation values mapped onto the color space coordinates set with the white balance determination areas.

FIG. 7C is a view showing an example of results obtained when the number of WB evaluation values in each white balance determination area is counted.

DETAILED DESCRIPTION OF THE PREFERRED EMBODIMENT

Preferred embodiments of the invention are described below with reference to the accompanying drawings.

<First Embodiment>

Figure 1:
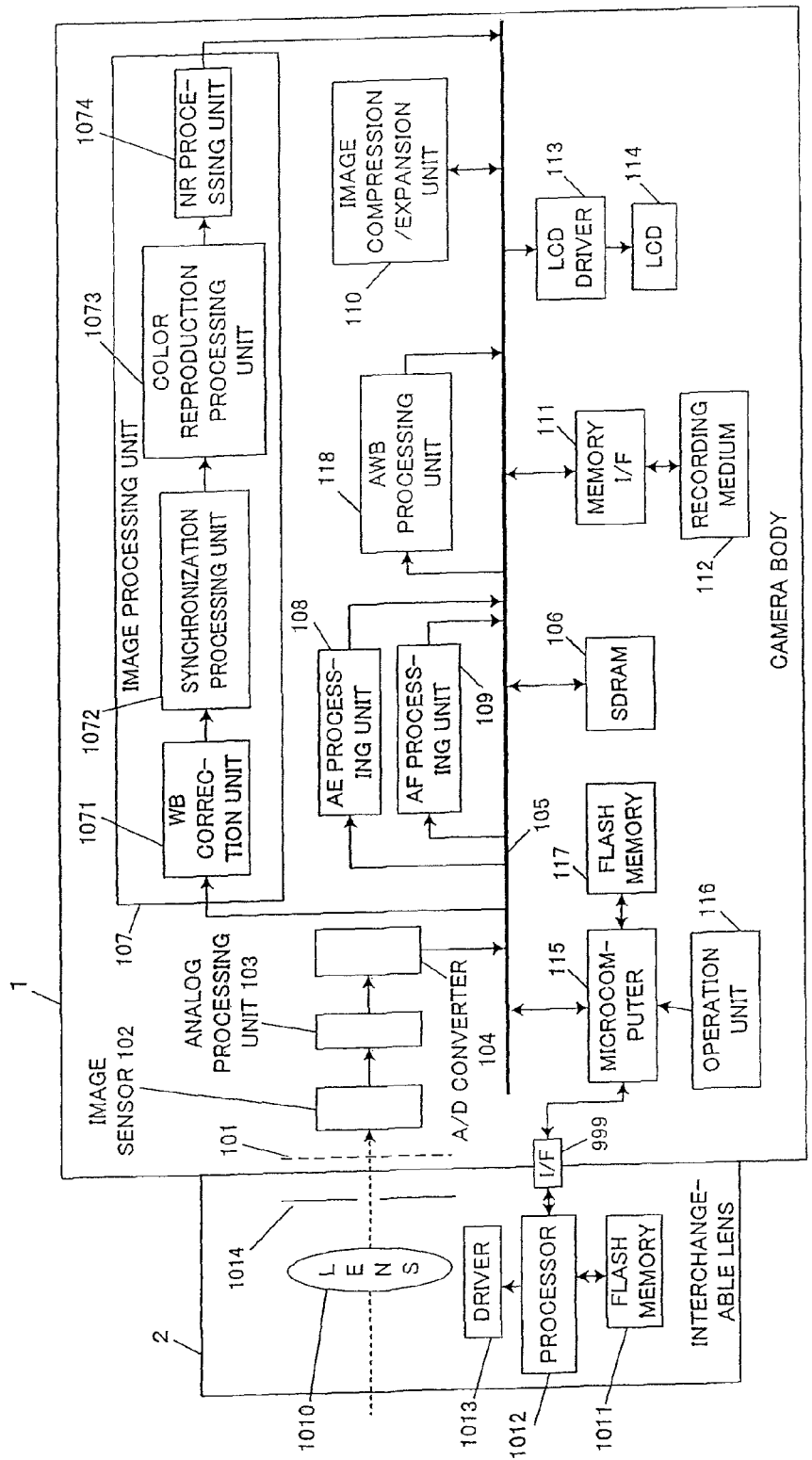
FIG. 1 is a block diagram showing the constitution of a digital still camera serving as an image-capturing device according to a first embodiment.

FIG. 1 is a block diagram showing the constitution of a digital still camera serving as an image-capturing device according to a first embodiment. The digital still camera shown in FIG. 1 includes a camera main body 1 and an interchangeable lens 2.

The interchangeable lens 2 includes a lens 1010, a Flash memory 1011, a microcomputer 1012, a driver 1013, and a diaphragm 1014. The interchangeable lens 2 is connected communicably to the camera main body 1 via an I/F 999.

The camera main body 1 includes a mechanical shutter 101, an image sensor 102, an analog processing unit 103, an analog/digital conversion unit 104 (A/D conversion unit 104 hereafter), a bus 105, an SDRAM (Synchronous Dynamic Random Access Memory) 106, an image processing unit 107, an AE processing unit 108, an AF processing unit 109, an image compression/expansion unit 110, a memory interface 111 (memory I/F 111 hereafter), a recording medium 112, an LCD driver 113, an LCD 114, a microcomputer 115, an operation unit 116, a Flash memory 117, and an AWB (Auto White Balance) processing unit 118.

The lens 1010 condenses an optical image of an object on the image sensor 102. The lens 1010 may be a single vision lens or a zoom lens.

The microcomputer 1012 is connected to the I/F 999, the Flash memory 1011, and the driver 1013 in order to read and write information stored in the Flash memory 1011 and control the driver 1013. The microcomputer 1012 is also capable of communicating with the microcomputer 115 via the I/F 999 in order to transmit information indicating a focal length of the lens and so on to the microcomputer 115 and receive information such as an aperture value from the microcomputer 115.

The driver 1013 drives the lens 1010 to modify the focal length and a focus position and drives the diaphragm 1014 upon reception of an instruction from the microcomputer 1012. The diaphragm 1014 is provided in the vicinity of the lens 1010 to adjust a light amount of the object.

The mechanical shutter 101 operates upon reception of an instruction from the microcomputer 115 to control an exposure time of the image sensor 102.

The image sensor 102 is formed by disposing a Bayer array color filter on a front surface of a photodiode constituting each pixel. The Bayer array is formed by providing a line on which R (Red) pixels and G (Gr: Green) pixels are disposed alternately and a line on which G (Gb: Green) and B (Blue) pixels are disposed alternately in a horizontal direction, and disposing these two lines alternately in a vertical direction. The image sensor 102 receives the light condensed by the lens 1010 on the photodiodes constituting the pixels, subjects the light to photoelectric conversion to convert the light amount into an electric charge amount, and outputs the electric charge to the analog processing unit 103. It should be noted that the image sensor 102 may be a CMOS type sensor or a CCD type sensor. Further, a color image sensor other than a Bayer array sensor may be used.

The analog processing unit 103 performs waveform shaping on an electric signal (an analog image signal) read from the image sensor 102 after reducing reset noise and the like, and then performs gain-up on the electric signal to achieve a target lightness. The A/D conversion unit 104 converts the analog image signal output by the analog processing unit 103 to a digital image signal (to be referred to hereafter as image data).

It should be noted that the image sensor 102, the analog processing unit 103, and the A/D conversion unit 104 may be referred to collectively as an image-capturing unit.

The bus 105 is a transfer path for transferring various types of data generated in the interior of the digital camera to the respective internal units of the digital camera. The bus 105 is connected to the A/D conversion unit 104, the SDRAM 106, the image processing unit 107, the AE processing unit 108, the AF processing unit 109, the image compression/expansion unit 110, the memory I/F 111, the LCD driver 113, the microcomputer 115, and the AWB processing unit 118.

The image data output by the A/D conversion unit 104 are stored temporarily in the SDRAM 106 via the bus 105. The SDRAM 106 is a storage unit that temporarily stores various data such as the image data obtained in the A/D conversion unit 104 and image data processed in the image processing unit 107 and the image compression/expansion unit 110.

The image processing unit 107 includes a white balance correction unit 1071 (WB correction unit 1071 hereafter), a synchronization processing unit 1072, a color reproduction processing unit 1073, and a noise reduction processing unit 1074 (NR processing unit 1074 hereafter). The image processing unit 107 implements various types of image processing on the image data read from the SDRAM 106. The WB correction unit (also referred to as a color correction unit) 1071 performs processing for correcting a white balance of the image data on the basis of a white balance gain calculated by the AWB processing unit 118. The synchronization processing unit 1072 performs processing to synchronize Bayer array image data into image data constituted by R, G, B information for each pixel. The color reproduction processing unit 1073 performs color reproduction processing for varying a tint of the image, and the NR processing unit 1074 performs noise reduction processing. Following the noise reduction processing, the image data are stored in the SDRAM 106.

The AE processing unit 108 calculates an object luminance from the image data. Data for calculating the object luminance may be an output of a dedicated photometric sensor. The AF processing unit 109 extracts a high frequency component signal from the image data, and obtains a focus evaluation value through AF (Auto Focus) integration processing.

The AWB processing unit (also referred to as a color information acquisition unit, a determination unit, an underwater color balance reference setting unit, an underwater color correction data calculation unit, and an onshore white balance correction data calculation unit) 118 calculates the white balance gain during auto white balance processing for adjusting the white balance automatically in accordance with a light source in the photographic condition of the image. In particular, the AWB processing unit 118 calculates a white balance gain for onshore photography during onshore image pickup, and calculates a white balance gain for underwater photography (underwater color correction data) during underwater image pickup.

When still image data are recorded, the image compression/expansion unit 110 reads the image data from the SDRAM 106, compresses the read image data in accordance with a JPEG (Joint Photographic Experts Group) compression format, and temporarily stores the compressed JPEG image data in the SDRAM 106. The microcomputer 115 creates a JPEG file by attaching a JPEG header required to construct the JPEG file to the JPEG image data stored in the SDRAM 106, and records the created JPEG file in the recording medium 112 via the memory I/F 111.

When moving image data are recorded, the image compression/expansion unit 110 reads the moving image data from the SDRAM 106, compresses the read moving image data in accordance with the H.264 format, for example, and temporarily stores the compressed moving image data in the SDRAM 106. Further, the image compression/expansion unit 110 performs processing to extract (expand) the compressed data on the basis of a command from the microcomputer 115.

The recording medium 112 is constituted by a memory card that can be attached to and detached from the camera main body 1, for example, but is not limited thereto.

The LCD driver 113 displays an image on the LCD 114. Image display includes quick view display in which image data are displayed briefly immediately after image pickup, reproduction display of a JPEG file recorded in the recording medium 112, and moving image display such as live view display. When the compressed data recorded in the recording medium 112 are to be reproduced, the image compression/expansion unit 110 reads the compressed data recorded in the recording medium 112, implements extraction (expansion) processing thereon, and then temporarily stores the extracted data in the SDRAM 106. The LCD driver 113 performs display by reading the expanded data from the SDRAM 106, converting the read data into a video signal, and then outputting the video signal to the LCD 114.

The microcomputer 115, which functions as a control unit, performs overall control of various sequences of the digital camera main body 1. The operation unit 116 and the Flash memory 117 are connected to the microcomputer 115.

The operation unit 116 is constituted by operating members such as a power button, a release button, and various types of input keys. When a user operates one of the operating members on the operation unit 116, the microcomputer 115 executes various types of sequences corresponding to the user operation. The power button is an operating member for issuing ON/OFF instructions with respect to a power supply of the digital camera. When the power button is pressed, the power supply of the digital camera is turned ON. When the power button is pressed again, the power supply of the digital camera is turned OFF. The release button is constituted by a two-stage switch that consists of a first release switch and a second release switch. When the release button is half-pressed to turn the first release switch ON, the microcomputer 115 performs image pickup preparation sequences such as the AE processing and AF processing. When the release button is fully pressed to turn the second release switch ON, the microcomputer 115 performs photography by executing an image pickup sequence.

The Flash memory (also referred to as a storage unit) 117 stores preset white balance gains for various light sources, an underwater area setting value and an underwater white balance gain locus setting value, to be described below, a low pass filter coefficient, various parameters required during an operation of the digital camera, a serial number for identifying the digital still camera, and so on. The Flash memory 117 also stores various programs executed by the microcomputer 115. In accordance with a program stored in the Flash memory 117, the microcomputer 115 reads parameters required for the various sequences from the Flash memory 117 and executes various processing.

Figure 2:
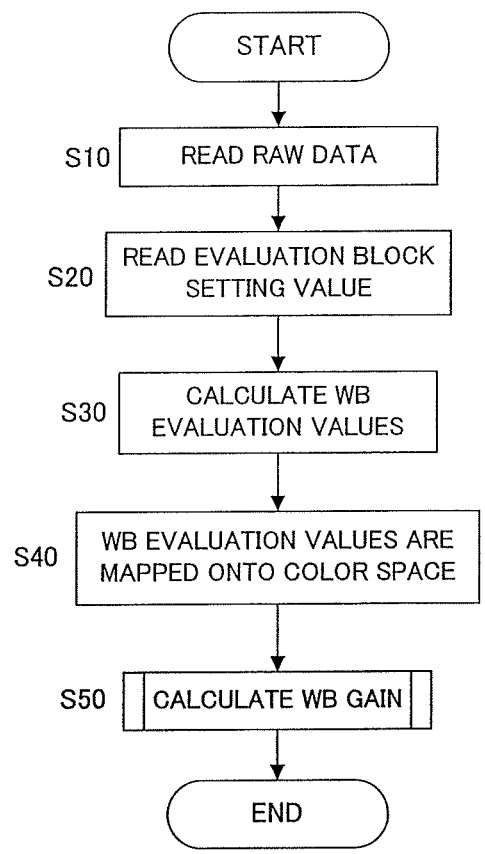
FIG. 2 is a flowchart showing processing content performed by an AWB processing unit during auto white balance processing.

FIG. 2 is a flowchart showing processing content performed by the AWB processing unit 118 during the auto white balance processing. In a step S10, image data (RAW data) are read from the SDRAM 106.

In a step S20, an evaluation block setting value for dividing the image data into a plurality of evaluation blocks is read from the Flash memory 117, and evaluation blocks are set on the basis of the read evaluation block setting value. The image data read in the step S10 are then divided into a plurality of evaluation blocks.

Figure 3A:
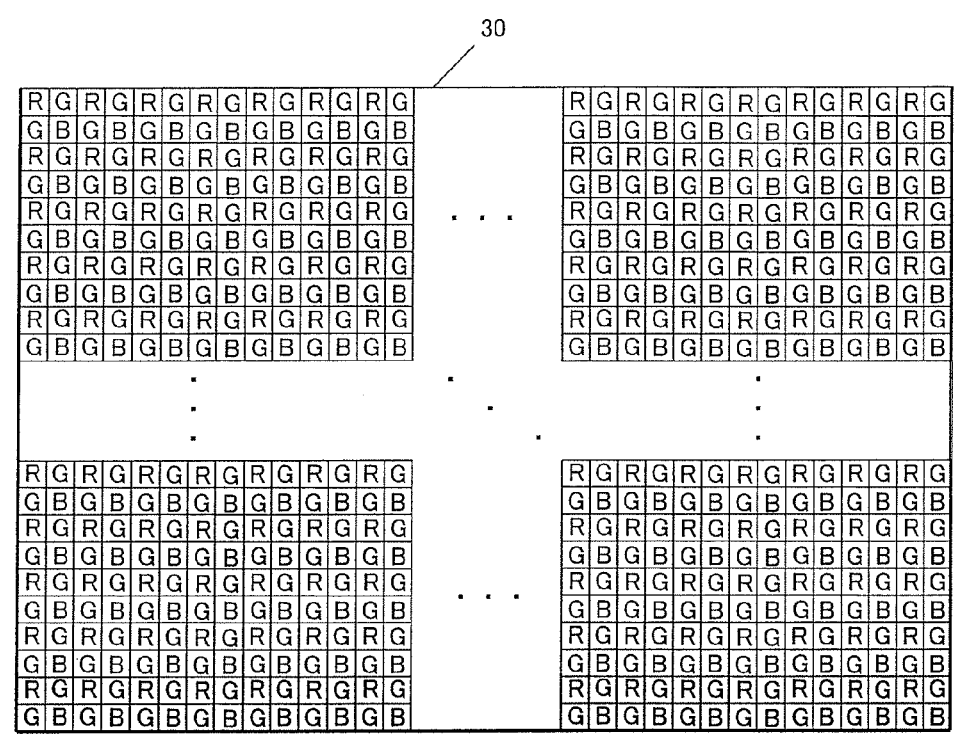
Figure 3B:
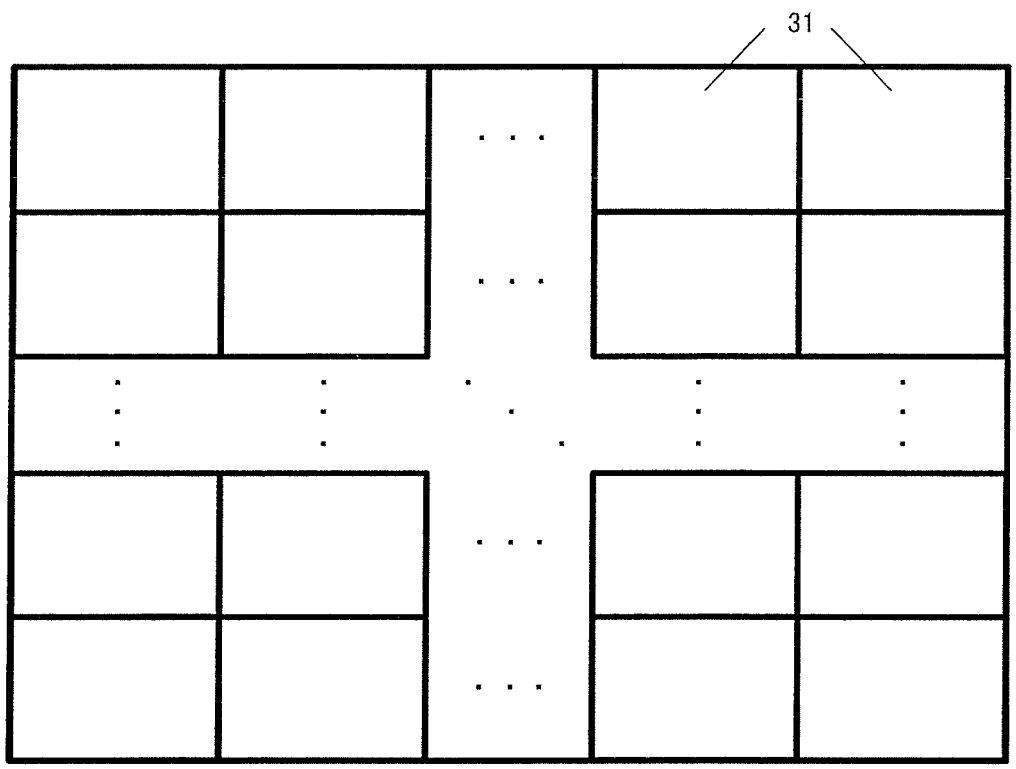
FIG. 3B is a view showing evaluation blocks for dividing the image data.
Figure 3C:
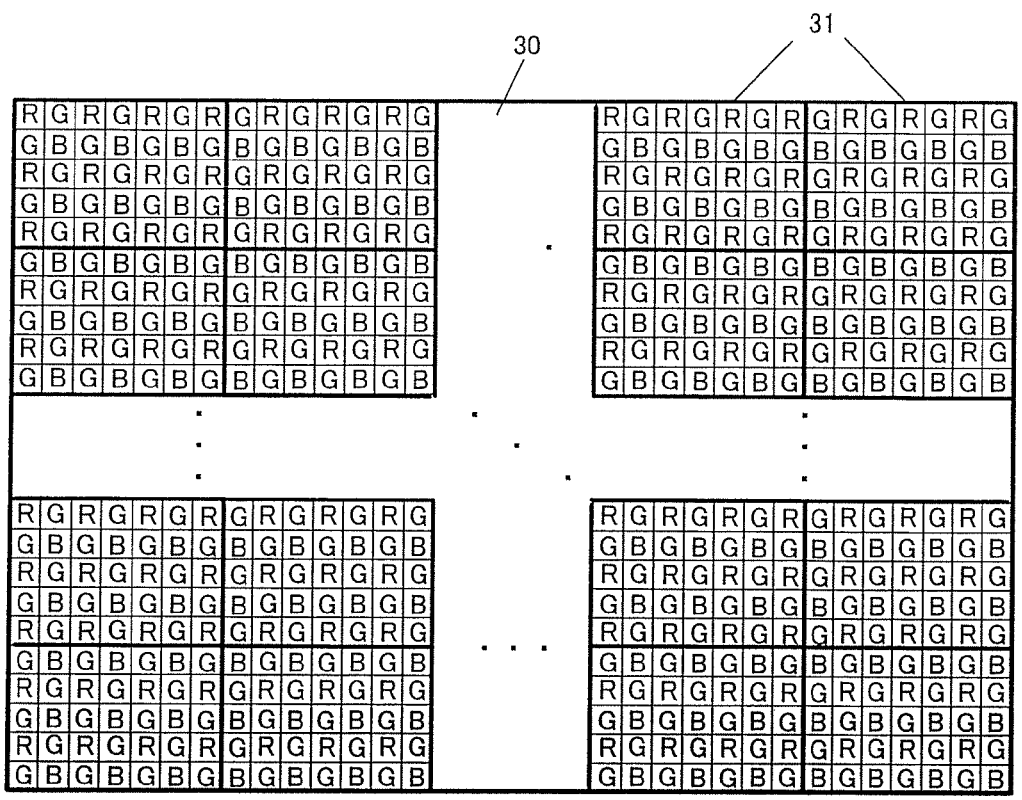
FIG. 3C is a view showing the image data divided into a plurality of evaluation blocks.

FIG. 3A is a view showing image data 30 read from the SDRAM 106. FIG. 3B is a view showing evaluation blocks 31 for dividing the image data. FIG. 3C is a view showing the image data 30 divided into a plurality of evaluation blocks 31.

In a step S30, a white balance evaluation value (to be referred to as a WB evaluation value hereafter) is calculated. For this purpose, first, average values of the respective R, G, B pixel values are calculated for each evaluation block region of the image data.

FIGS. 4A to 4C are views showing results obtained when the average values of the respective R, G, B pixel values are calculated for each evaluation block region of the image data.

Figures 5A, 5B:
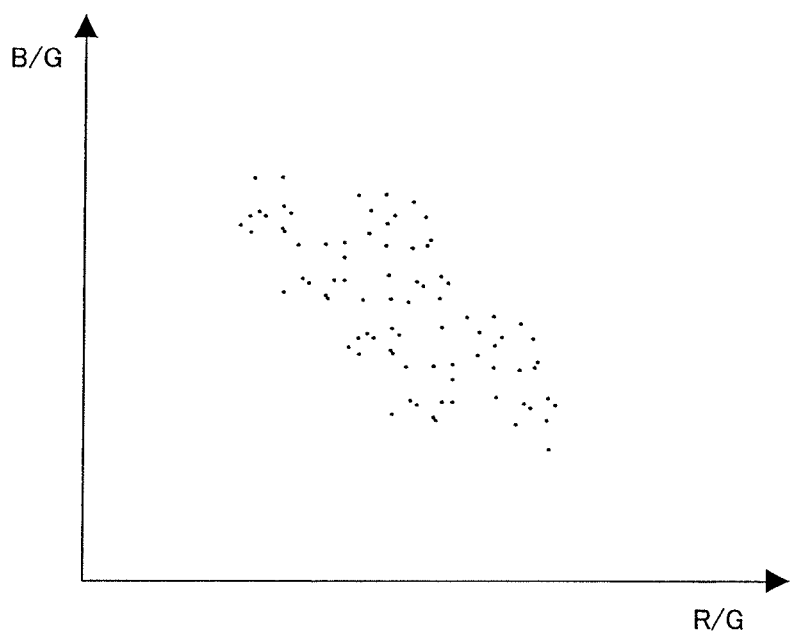
FIG. 5A is a view showing a condition realized when a WB evaluation value is calculated for each evaluation block region.
FIG. 5B is a view showing a condition realized when the WB evaluation values of the respective evaluation block regions are mapped onto color space coordinates having R/G on the abscissa and B/G on the ordinate.

Next, a WB evaluation value is calculated for each evaluation block region. Assuming that the average values of the R, G, B pixel values in a certain evaluation block region are R_ave, G_ave, B_ave, respectively, the WB evaluation value is R_ave/G_ave, B_ave/G_ave. FIG. 5A is a view showing a condition realized when the WB evaluation value is calculated for each evaluation block region.

In a step S40, the WB evaluation values calculated in the step S30 are mapped onto color space coordinates having R/G on the abscissa and B/G on the ordinate. FIG. 5B is a view showing a condition realized when the WB evaluation values of the respective evaluation block regions are mapped onto color space coordinates having R/G on the abscissa and B/G on the ordinate.

It should be noted that the color space coordinates for calculating the white balance gain are not limited to coordinates having R/G on the abscissa and B/G on the ordinate. For example, when a luminance signal is set as Y, color space coordinates having a color difference (R−Y) on the abscissa and a color difference (B−Y) on the ordinate may be used. The luminance signal Y is expressed by a following Equation (1).

$$Y=0.299 \times R+0.587 \times G+0.114 \times B \tag{1}$$

In a step S50, the white balance gain is calculated. In the image-capturing device according to this embodiment, the white balance gain is calculated using a different method depending on whether the image data are generated by underwater photography or onshore photography. The white balance gain calculation processing employed when the image data are generated by onshore photography will be described using a flowchart shown in FIG. 6. The white balance gain calculation processing employed when the image data are generated by underwater photography will be described using a flowchart shown in FIG. 10.

Figure 6:
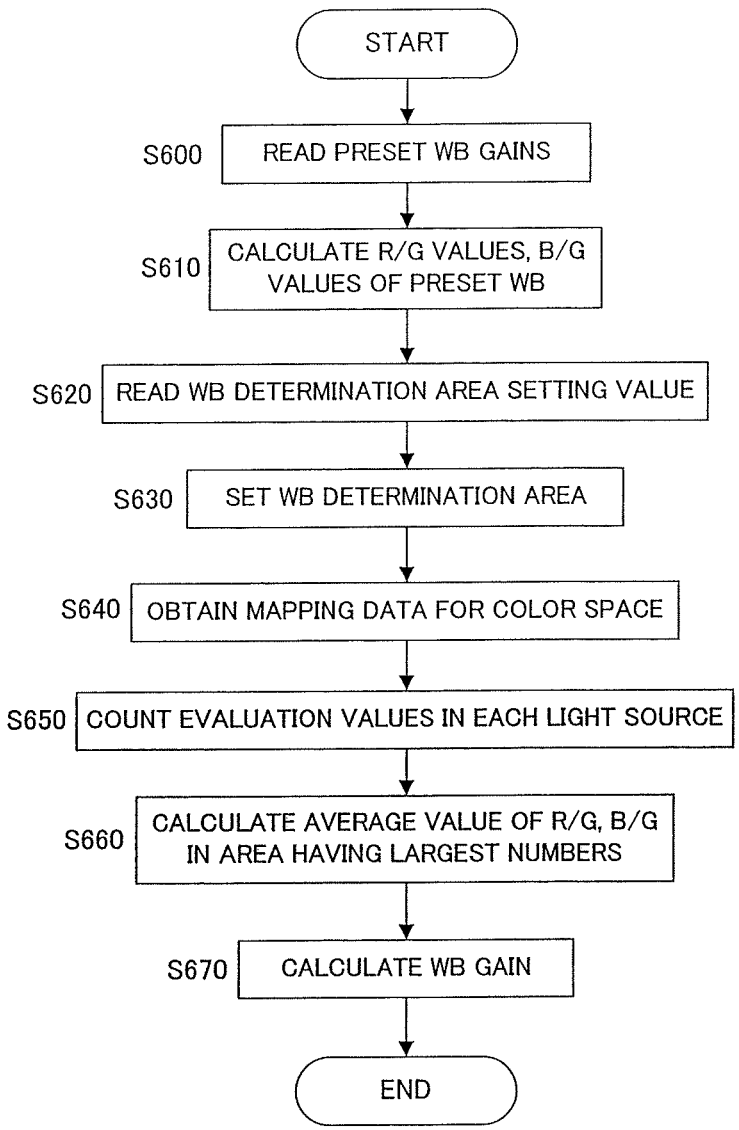
FIG. 6 is a flowchart showing a white balance gain calculation processing.

In a step S600 of the flowchart shown in FIG. 6, the preset white balance gains of the respective light sources are read from the Flash memory 117. The respective light sources include shade, cloudy sky, sunlight, twilight, and an electric bulb, for example.

In a step S610, the white balance gains read in the step S600 are converted into R/G values and B/G values.

In a step S620, a white balance determination area setting value is read from the Flash memory 117.

In a step S630, a white balance determination area is set on the color space coordinates having R/G on the abscissa and B/G on the ordinate using the R/G value and B/G value of the preset white balance gain of each light source, determined in the step S610, and the white balance determination area setting value read in the step S620. More specifically, a predetermined range centering on a position determined by the R/G value and B/G value of the preset white balance gain of each light source is set as the white balance determination area.

FIG. 7A is a view showing white balance determination areas set on color space coordinates having R/G on the abscissa and B/G on the ordinate. In the example shown in FIG. 7A, a shade area 71, a cloudy sky area 72, a sunlight area 73, a twilight area 74, and an electric bulb area 75 are shown as the white balance determination areas. It should be noted that a curve 77 linking the positions of the preset white balance gains of the respective light sources on the color space coordinates having R/G on the abscissa and B/G on the ordinate is known as a black body locus.

In a step S640, mapping data (the WB evaluation values) for mapping the image data onto the color space coordinates, determined in the step S40 of the flowchart shown in FIG. 2, are obtained, and the obtained data are mapped onto the color space coordinates.

FIG. 7B is a view showing the WB evaluation values mapped onto the color space coordinates set with the white balance determination areas.

In a step S650, the number of WB evaluation values in each white balance determination area 71 to 75 is counted. FIG. 7C is a view showing an example of results obtained when the number of WB evaluation values in each white balance determination area 71 to 75 is counted.

In a step S660, the white balance determination area having the largest number of WB evaluation values is specified on the basis of the count results obtained in the step S650, and an average value of the WB evaluation values in the specified area, or in other words an average value of R/G, B/G, is calculated.

In a step S670, an inverse G/R, G/B of the average value of R/G, B/G calculated in the step S660 is calculated as the white balance gain. The WB correction unit 1071 in the image processing unit 107 then performs processing to correct the white balance of the image data on the basis of the calculated white balance gain.

Next, white balance correction performed on image data obtained by underwater photography will be described.

Figure 8A:
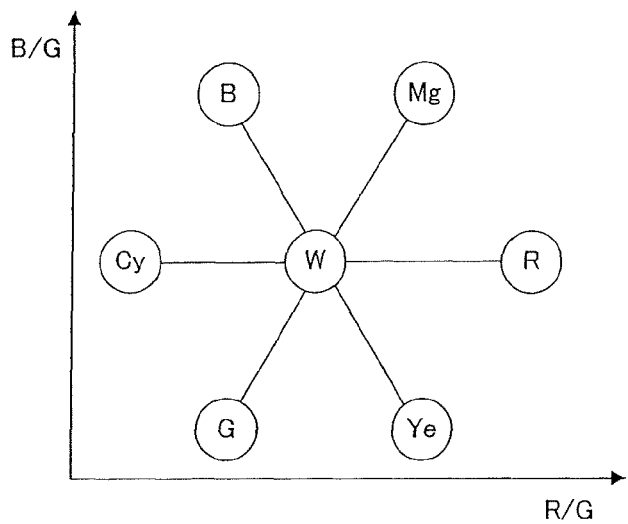
FIG. 8A is a view showing positional relationships of red, blue, green, magenta, yellow, and cyan relative to white on the color space coordinates having R/G on the abscissa and B/G on the ordinate.

FIG. 8A is a view showing positional relationships of red (R), blue (B), green (G), magenta (Mg), yellow (Ye), and cyan (Cy) relative to white (W) on the color space coordinates having R/G on the abscissa and B/G on the ordinate. In the white balance correction performed on image data obtained by onshore photography, as shown in FIG. 7A, correct color reproduction can be achieved by aligning a white point with the preset white balance positions corresponding to the respective light sources on the block body locus.

Figure 8B:
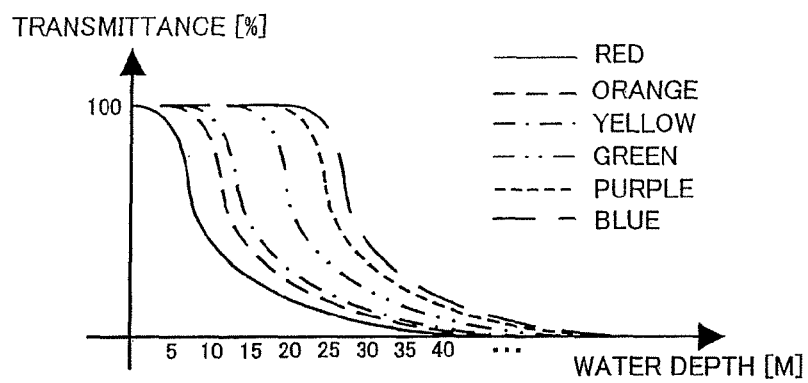
FIG. 8B is a view showing a relationship between a water depth and a transmittance of each color in water.

In water, however, light is typically absorbed by seawater as the depth of the water increases, leading to a bluish tint. FIG. 8B is a view showing a relationship between a water depth and a transmittance of each color in water. As shown in FIG. 8B, in water, each color exhibits a different transmittance attenuation characteristic corresponding to the water depth. As the depth of the water increases, red attenuates first.

Figure 8C:
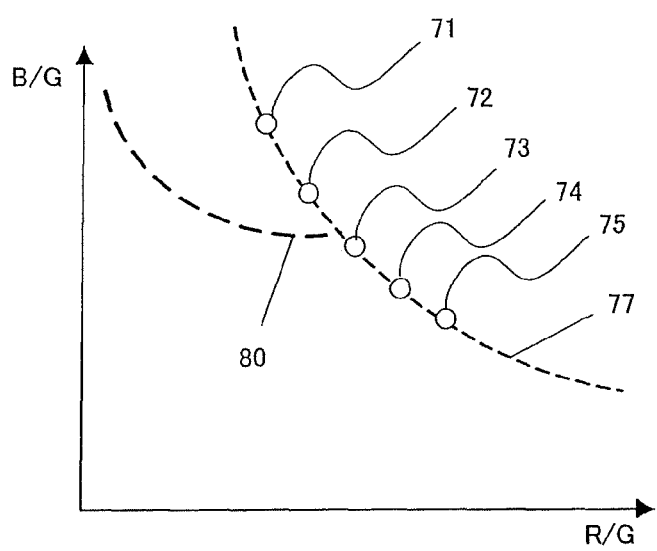
FIG. 8C is a view showing an underwater white point locus on color space coordinates having R/G on the abscissa and B/G on the ordinate, which is based on the transmittance attenuation characteristic of each color, shown in FIG. 8B.

FIG. 8C is a view showing an underwater white point locus 80 on color space coordinates having R/G on the abscissa and B/G on the ordinate, which is based on the transmittance attenuation characteristic of each color, shown in FIG. 8B. As shown in FIG. 8C, the underwater white point locus 80 is different to the black body locus 77, which serves as an onshore white point locus. When white balance correction is performed on the basis of the underwater white point locus 80, the white point can be aligned with white. In water, however, great variation occurs not only in the white point but in the entire tint distribution due to the attenuation characteristics shown in FIG. 8B. In water, therefore, a favorable result is not obtained with respect to the overall color reproduction even when the white point is aligned with white.

Figure 9A:
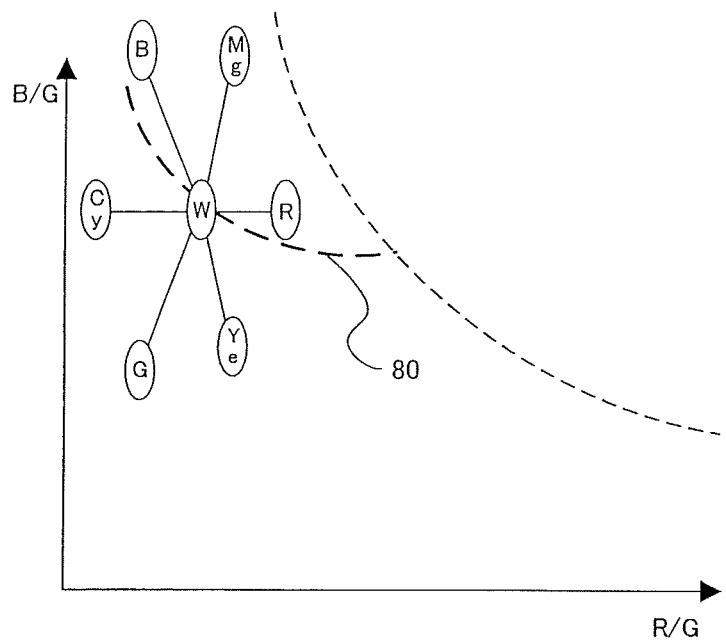
FIG. 9A is a view showing the positional relationships of red, blue, green, magenta, yellow, and cyan relative to white at a water depth position of 5 m.

FIG. 9A is a view showing the positional relationships of red, blue, green, magenta, yellow, and cyan relative to white in a case where white balance correction is performed on the basis of the white point locus 80 in relation to image data picked up at a water depth position of 5 m. In this case, as described above using FIG. 8B, a red component decreases to a greater extent than the other colors.

Figure 9B:
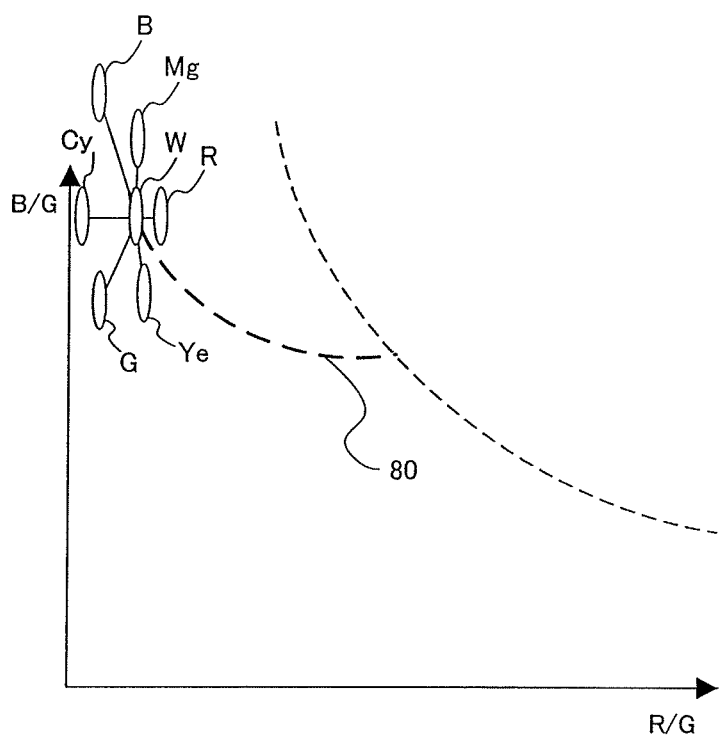
FIG. 9B is a view showing the positional relationships of red, blue, green, magenta, yellow, and cyan relative to white at a water depth position of 20 m.

FIG. 9B is a view showing the positional relationships of red, blue, green, magenta, yellow, and cyan relative to white in a case where white balance correction is performed on the basis of the white point locus 80 in relation to image data picked up at a water depth position of 20 m. In this case, the red component decreases to a much greater extent than the other colors, and reductions also occur in a magenta component and a yellow component.

Hence, when image data picked up underwater are simply subjected to white balance correction for aligning the white point with white, a photograph on which red is unnaturally emphasized or a photograph on which blue disappears, making it impossible to tell that the photograph was taken underwater, is obtained.

It is evident from the above that in a scene where the water is shallow and blue fog is light, it is important to apply a white balance gain that is comparatively close to the underwater white point locus in order to realize optimum color reproduction. In a scene where the water is deep and blue fog is heavy, on the other hand, it is important to apply a white balance gain in a different position to the underwater white point locus to prevent excessive tint emphasis and obtain an underwater photograph having natural blueness. In the image-capturing device according to the first embodiment, appropriate color correction corresponding to the water depth is performed on an image photographed underwater.

It should be noted that in this embodiment, the white balance correction processing performed on the image data picked up underwater is not simply processing for aligning the white point with white, as described using FIGS. 9A and 9B, and it is therefore more appropriate to refer to this processing using a separate name such as color balance correction processing or color correction processing, for example. For convenience, however, the processing is referred to here as white balance correction processing. Accordingly, color correction data used when performing the white balance correction processing on image data picked up underwater are likewise referred to using the typically employed term "white balance gain" for convenience.

Figure 10:
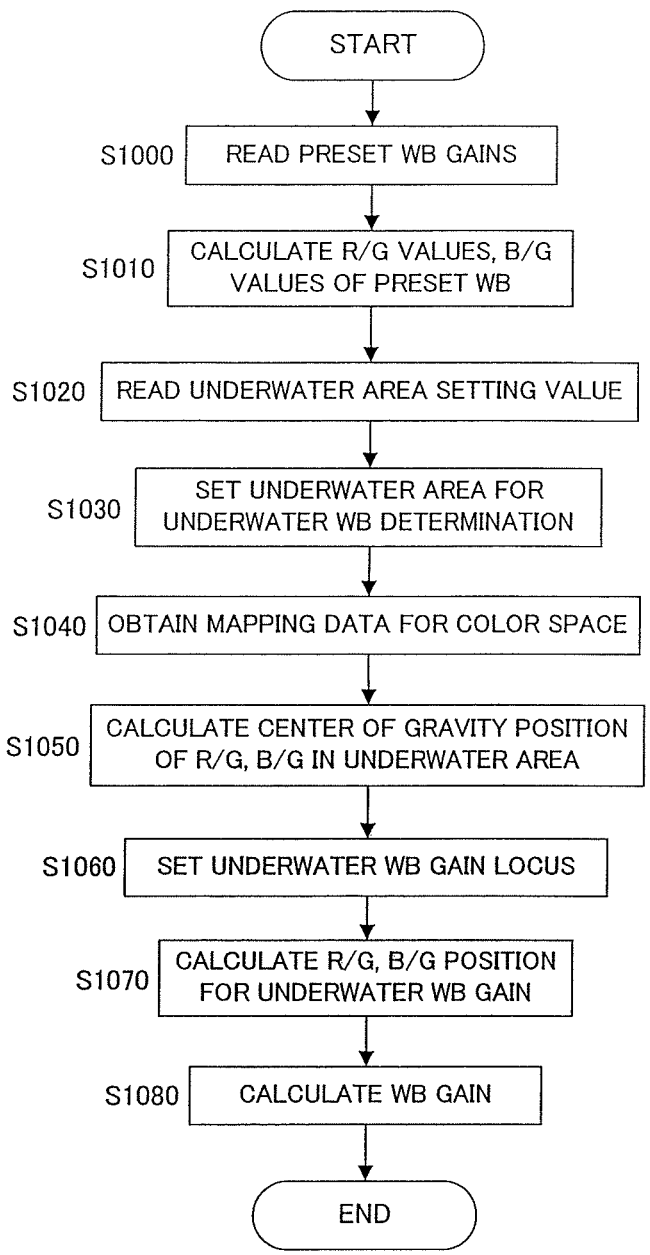
FIG. 10 is a flowchart showing in detail the content of the white balance gain calculation processing performed by the AWB processing unit on image data picked up underwater.

FIG. 10 is a flowchart showing in detail the content of the white balance gain calculation processing performed by the AWB processing unit 118 on image data picked up underwater. The AWB processing unit 118 performs the processing of the flowchart shown in FIG. 10 when the processing subject image data are determined to be image data picked up underwater. The processing subject image data are determined to be image data picked up underwater when a white balance setting mode is set to an underwater mode, for example. However, the method of determining whether or not the processing subject image data are image data picked up underwater is not limited to this determination method, and the determination may be made on the basis of a measurement result obtained by a bathometer provided in the image-capturing device, for example.

In a step S1000, the preset white balance gains of the respective light sources are read from the Flash memory 117. This processing is identical to the processing of the step S600 in the flowchart shown in FIG. 6.

In a step S1010, the white balance gains read in the step S1000 are converted into R/G values and B/G values. This processing is identical to the processing of the step S610 in the flowchart shown in FIG. 6.

In a step S1020, an underwater area setting value for calculating an underwater white balance gain is read from the Flash memory 117.

In a step S1030, an underwater area is set on color space coordinates having R/G on the abscissa and B/G on the ordinate on the basis of the setting value read in the step S1020.

Figure 11A:
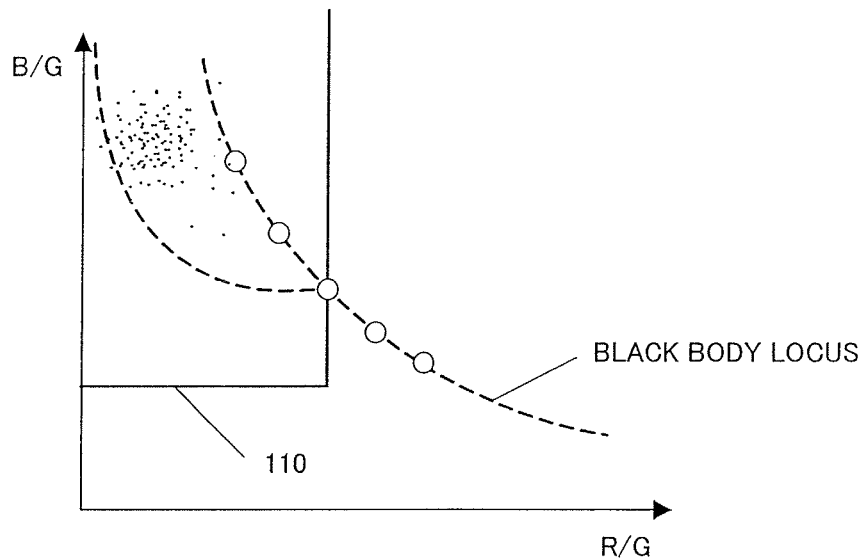
FIG. 11A is a view showing an example of an underwater area set on color space coordinates having R/G on the abscissa and B/G on the ordinate.

FIG. 11A is a view showing an example of an underwater area 1100 set on color space coordinates having R/G on the abscissa and B/G on the ordinate.

In a step S1040, the mapping data (the WB evaluation values) for mapping the image data onto the color space coordinates, determined in the step S40 of the flowchart shown in FIG. 2, are obtained, and the obtained data are mapped onto the color space coordinates (see FIG. 11A).

In a step S1050, a center of gravity position of the WB evaluation values existing in the underwater area 1100 is calculated.

In a step S1060, the underwater white balance gain locus setting value is read from the Flash memory 117, and on the basis of the read setting value, an underwater white balance gain locus (an underwater color balance reference) is set on the color space coordinates having R/G on the abscissa and B/G on the ordinate. The underwater white balance gain locus serves as a color correction reference when color-correcting image data picked up underwater.

Figure 11B:
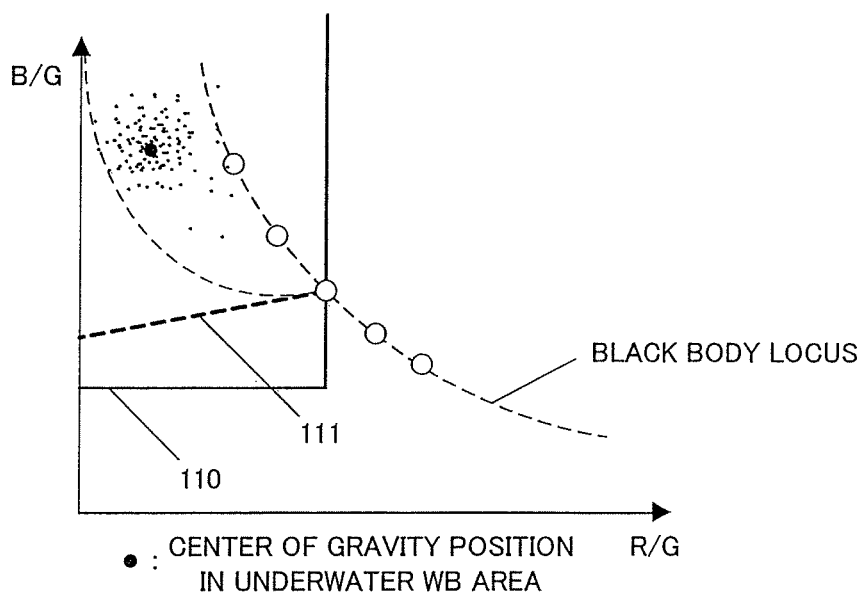
FIG. 11B is a view showing an example of an underwater white balance gain locus set the on color space coordinates having R/G on the abscissa and B/G on the ordinate.
Figure 12A:
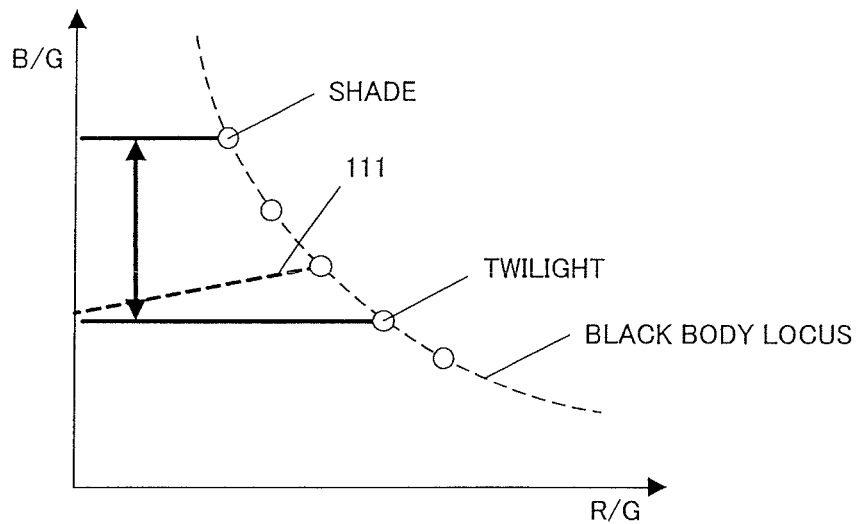
FIG. 12A is a view showing a setting range of the underwater white balance gain locus.

FIG. 11B is a view showing an example of an underwater white balance gain locus 1110 set the on color space coordinates having R/G on the abscissa and B/G on the ordinate. This underwater white balance gain locus 1110 differs from the conventional white balance gain locus 80 (see FIG. 8C) determined using white as a reference in that it is determined in order to obtain an image that reproduces appropriate colors in accordance with the water depth. The underwater white balance gain locus 1110 is positioned further toward an origin side than the black body locus on the color space coordinates having R/G on the abscissa and B/G on the ordinate, and is typically set between a color temperature envisaged as the color temperature of shade and a color temperature envisaged as the color temperature of twilight (see FIG. 12A).

In a step S1070, a position on the underwater white balance gain locus is determined from the center of gravity position calculated in the step S1050. Here, a perpendicular to a line representing the underwater white balance gain locus is drawn from the center of gravity position calculated in the step S1050, whereupon an intersection between the perpendicular and the line representing the underwater white balance gain locus is determined.

Figure 12B:
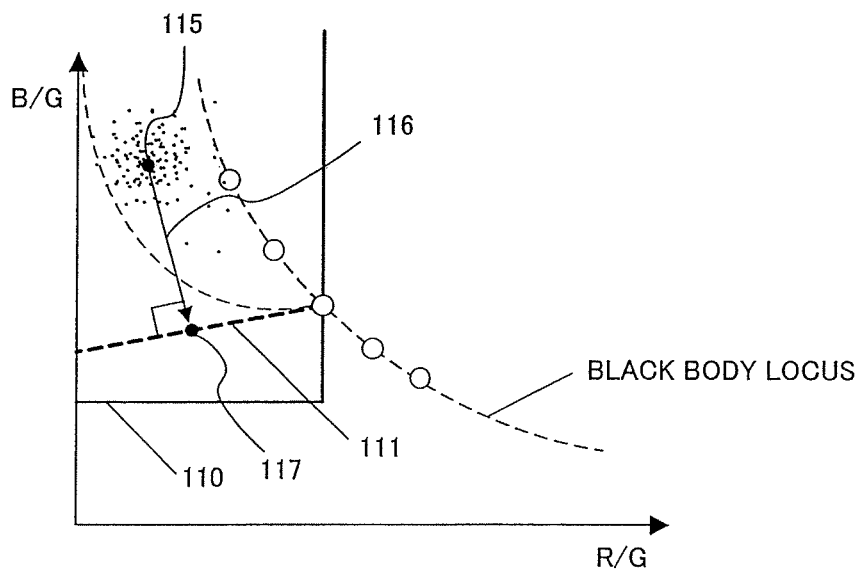
FIG. 12B is a view illustrating a method of determining a position on the underwater white balance gain locus from a center of gravity position of the WB evaluation values existing within the underwater area.

FIG. 12B is a view illustrating a method of determining a position on the underwater white balance gain locus 1110 from a center of gravity position 115 of the WB evaluation values existing within the underwater area 1100. A perpendicular 1160 to the underwater white balance gain locus 1110 is drawn from the center of gravity position 1150, whereupon an intersection 1170 between the perpendicular 1160 and the underwater white balance gain locus 1110 is determined.

In a step S1080, the inverses G/R, G/B of the coordinates R/G, B/G of the position determined in the step S1070 are calculated as the white balance gain. Thereafter, the WB correction unit 1071 in the image processing unit 107 performs processing (color correction processing) to correct the white balance of the image data on the basis of the calculated white balance gain.

According to the method described above, an appropriate white balance gain corresponding to the water depth can be calculated. This will now be described using FIGS. 13A, 13B and 13C.

Figure 13A:
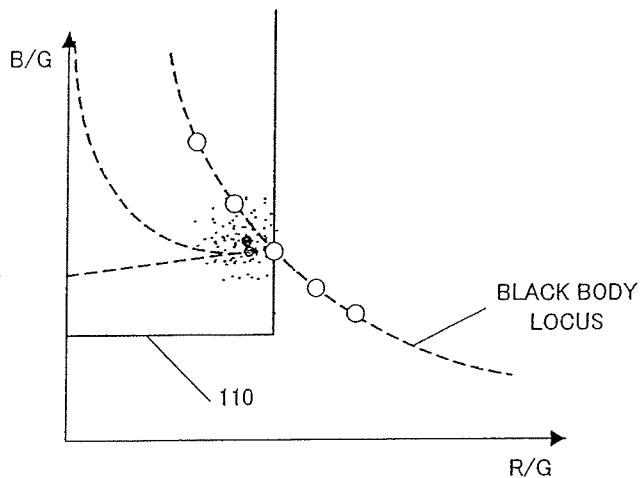
FIG. 13A is a view showing a method of calculating the white balance gain in a case where the water is shallow.
Figure 13B:
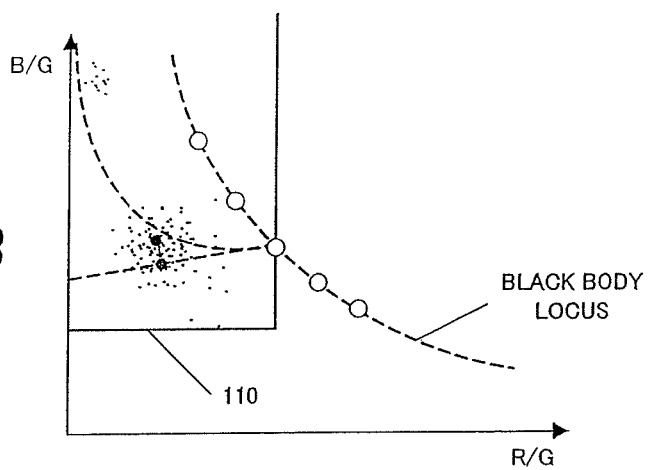
FIG. 13B is a view showing a method of calculating the white balance gain in a case where the water is comparatively deep but a surface area of a blue region in the image is small.
Figure 13C:
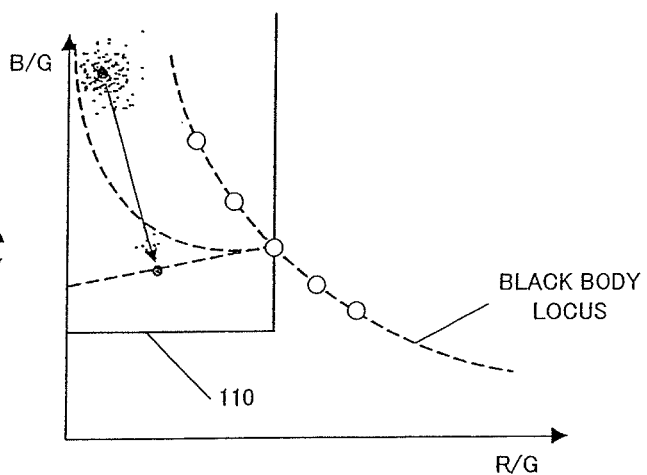
FIG. 13C is a view showing a method of calculating the white balance gain in a case where the water is comparatively deep and the surface area of the blue region in the image is large.

FIGS. 13A, 13B and 13C are views showing methods of calculating the white balance gain in a case where the water is shallow, a case where the water is comparatively deep but a surface area of a blue region in the image is small, and a case in which the water is comparatively deep and the surface area of the blue region in the image is large, respectively.

When the water is shallow, as shown in FIG. 13A, the point on the underwater white balance gain locus determined in the step S1070 is positioned close to the black body locus. In other words, similarly to onshore photography, the tints of white and colors other than white can be reproduced accurately through white balance correction for whitening the white point.

When the water is comparatively deep but the surface area of the blue region in the image is small, as shown in FIG. 13B, the point on the underwater white balance gain locus determined in the step S1070 is positioned close to the distribution of the WB evaluation values, and therefore a white balance gain that is close to the tint distribution of the image can be calculated. When, on the other hand, the water is comparatively deep and the surface area of the blue region in the image is large, as shown in FIG. 13C, a white balance gain for obtaining an image on which the blueness is shown to full advantage without forcibly emphasizing tints other than blue can be calculated.

Hence, in the image-capturing device according to the first embodiment, color information is obtained from the image data, and an underwater color balance reference is set as a color correction reference for use when color correction is performed on image data picked up underwater. When it is determined that the image data have been generated through underwater photography, underwater color correction data are calculated on the basis of the obtained color information and the underwater color balance reference, whereupon color correction is performed on the image data generated through underwater photography on the basis of the calculated underwater color correction data. In so doing, appropriate color correction corresponding to the water depth can be performed on the image data picked up underwater, and as a result, a colorful underwater photograph can be obtained.

<Second Embodiment>

In an image-capturing device according to a second embodiment, a final white balance gain is calculated on the basis of the white balance gain (onshore white balance gain) calculated when white balance correction is performed on image data picked up onshore and the white balance gain (underwater white balance gain) calculated when white balance correction is performed on image data picked up underwater.

Figure 14:
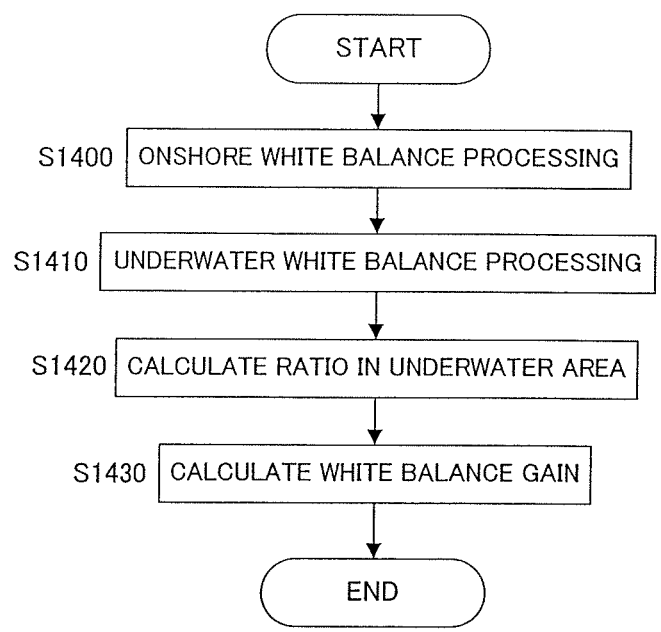
FIG. 14 is a flowchart showing the content of processing performed by the AWB correction unit in the image-capturing device according to a second embodiment.

FIG. 14 is a flowchart showing the content of processing performed by the AWB correction unit (also referred to as a final color correction data calculation unit) 118 in the image-capturing device according to the second embodiment.

In a step S1400, onshore white balance gain calculation processing is performed. More specifically, the processing from the step S600 to the step S670 of the flowchart shown in FIG. 6 is performed.

In a step S1410, underwater white balance gain calculation processing is performed. More specifically, the processing from the step S1000 to the step S1080 of the flowchart shown in FIG. 10 is performed.

In a step S1420, a ratio of the WB evaluation values existing in the underwater area 1100 (see FIGS. 11A and 11B), from among the WB evaluation values mapped onto the color space coordinates having R/G on the abscissa and B/G on the ordinate, is calculated.

In a step S1430, the final white balance gain is calculated on the basis of the onshore white balance gain and underwater white balance gain and the ratio calculated in the step S1420. More specifically, the final white balance gain is calculated by performing weighted synthesis on the onshore white balance gain and the underwater white balance gain such that the weighting of the underwater white balance gain increases as the ratio calculated in the step S1420 increases. Further, the final white balance gain is calculated by performing weighted synthesis on the onshore white balance gain and the underwater white balance gain such that the weighting of the onshore white balance gain increases as the ratio calculated in the step S1420 decreases.

It should be noted that when the ratio calculated in the step S1420 is ½, the final white balance gain is calculated by performing weighted synthesis on the onshore white balance gain and the underwater white balance gain such that the onshore white balance gain and the underwater white balance gain have an equal weighting.

Thereafter, the WB correction unit 1071 in the image processing unit 107 performs processing (color correction processing) to correct the white balance of the image data on the basis of the calculated white balance gain.

Hence, in the image-capturing device according to the second embodiment, underwater color correction data and onshore white balance correction data are calculated, whereupon final color correction data are calculated on the basis of the color information obtained from the image data and the underwater color correction data and onshore white balance correction data. The image data are then color-corrected on the basis of the final color correction data, regardless of whether or not the image data were generated by underwater photography. As a result, it is possible to switch seamlessly between the onshore white balance gain and the underwater color correction data in a case where the photography location is changed from onshore to underwater or from underwater to onshore.

In the above description of the first and second embodiments, it is assumed that the processing performed by the image-capturing device is hardware processing, but this invention need not be limited to such a constitution. For example, a constitution in which the processing is performed by software may be employed. In this case, a computer includes a CPU, a main storage device such as a RAM, and a computer-readable storage medium storing a program for realizing all or a part of the processing described above. Here, the program is referred to as a color correction program. By having the CPU read the color correction program stored on the storage medium and execute information processing/calculation processing, similar processing to that of the image-capturing device described above is realized.

Here, a computer-readable storage medium denotes a magnetic disk, a magneto-optical disk, a CD-ROM, a DVD-ROM, a semiconductor memory, and so on. Further, the color correction program may be distributed to the computer by a communication line, whereupon the computer executes the received distributed color correction program.

This invention is not limited to the first and second embodiments described above and may be subjected to various modifications and applications within a scope that does not depart from the spirit of the invention. For example, in the above embodiments, the underwater white balance gain locus setting value is stored in advance in the Flash memory 117, and the underwater white balance gain locus is set on the basis of the underwater white balance gain locus setting value stored in the Flash memory 117. However, coordinate data in which the straight line 1110 representing the underwater white balance gain locus, shown in FIG. 11B, is set as a reference coordinate axis may be stored in advance in the Flash memory 117 such that the underwater white balance gain locus is set on the basis of the coordinate data stored in the Flash memory 117. Further, table data defining a relationship between the color information of the image data and the underwater white balance gain may be stored in advance in the Flash memory 117 such that the underwater white balance gain is calculated on the basis of the table data and the color information of the image data stored in the Flash memory 117. According to this method, the underwater white balance gain can be calculated from the center of gravity position of the WB evaluation values calculated in the step S1050 of FIG. 10 by referring to the table data.

The underwater white balance gain locus (underwater color balance reference) serving as the color correction reference when color correction is performed on image data picked up underwater is not limited to the locus represented by the straight line 1110 shown in FIG. 11B. As described using FIG. 12A, however, the underwater white balance gain locus must be set lower than the black body locus with respect to the R/G axis and between the color temperature envisaged as the color temperature of shade and the color temperature envisaged as the color temperature of twilight with respect to the B/G axis.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

This application claims priority based on JP2010-218759, filed with the Japan Patent Office on Sep. 29, 2010, the entire contents of which are incorporated into this specification by reference.

What is claimed is:

1. An image-capturing device comprising:
   an image-capturing unit that generates image data by subjecting object light received by an image sensor to photoelectric conversion;
   a color information acquisition processing module that obtains color information from the image data;
   a determination processing module that determines whether the image data have been generated by underwater photography or onshore photography;

an underwater color determination area setting processing module that sets an underwater color determination area in color space coordinates for performing an underwater color determination;

an evaluation value mapping processing module that maps a color balance evaluation value, which is obtained from the image data, on the color space coordinates;

an underwater color balance reference setting processing module that sets an underwater color balance reference that serves as a color correction reference when color correction is performed on image data picked up underwater;

an estimation processing module that estimates an underwater color balance on the basis of the color balance evaluation value mapped on the underwater color determination area and the underwater color balance reference in a case where the determination processing module determines that the image data have been generated by underwater photography;

an underwater color correction data calculation processing module that calculates underwater color correction data on the basis of the color information obtained by the color information acquisition processing module and the underwater color balance estimated by the estimation processing module; and a color correction processing module that performs color correction on the image data generated by underwater photography on the basis of the underwater color correction data calculated by the underwater color correction data calculation processing module.

2. The image-capturing device as defined in claim 1, further comprising an onshore white balance correction data calculation processing module that calculates onshore white balance correction data on the basis of the color information obtained by the color information acquisition processing module and a white balance reference that serves as a reference when white balance correction is performed on image data picked up onshore in a case where the determination processing module determines that the image data have been generated by onshore photography, wherein the color correction processing module performs white balance correction on the image data generated by onshore photography on the basis of the onshore white balance correction data.

3. The image-capturing device as defined in claim 2, further comprising a final color correction data calculation processing module that calculates final color correction data on the basis of the color information obtained by the color information acquisition processing module, the underwater color correction data, and the onshore white balance correction data, wherein the color correction processing module performs color correction on the image data on the basis of the final color correction data calculated by the final color correction data calculation processing module regardless of whether the image data have been generated by underwater photography or onshore photography.

4. The image-capturing device as defined in claim 1, further comprising a storage unit that stores data representing the underwater color balance reference, wherein the underwater color balance reference setting processing module sets the underwater color balance reference on the basis of the data stored in the storage unit.

5. The image-capturing device as defined in claim 1, further comprising a storage unit that stores coordinate data in which the underwater color balance reference is set as at least one reference coordinate axis, wherein the underwater color balance reference setting processing module sets the underwater color balance reference on the basis of the coordinate data stored in the storage unit.

6. The image-capturing device as defined in claim 1, further comprising a storage unit that stores table data defining a relationship between the color information of the image data and the underwater color correction data, wherein the underwater color correction data calculation processing module calculates the underwater color correction data on the basis of the color information obtained by the color information acquisition processing module and the table data stored in the storage unit.

7. The image-capturing device as defined in claim 1, wherein the underwater color correction data calculated by the underwater color correction data calculation processing module are within a predetermined color balance range.

8. The image-capturing device as defined in claim 1, wherein the underwater color balance reference setting processing module sets the underwater color balance reference in the underwater color determination area in the color space coordinates.

9. An image processing method comprising:
a step of inputting image data;
a step of obtaining color information from the image data;
a step of determining whether the image data have been generated by underwater photography or onshore photography;
a step of setting an underwater color determination area in color space coordinates for performing an underwater color determination;
a step of mapping a color balance evaluation value, which is obtained from the image data, on the color space coordinates;
a step of setting an underwater color balance reference that serves as a color correction reference when color correction is performed on image data picked up underwater;
a step of estimating an underwater color balance on the basis of the color balance evaluation value mapped on the underwater color determination area and the underwater color balance reference in a case where it is determined that the image data have been generated by underwater photography;
a step of calculating underwater color correction data on the basis of the color information and the underwater color balance; and
a step of performing color correction on the image data generated by underwater photography on the basis of the underwater color correction data.

* * * * *